United States Patent [19]

Eswaran

[11] Patent Number: 4,847,889

[45] Date of Patent: Jul. 11, 1989

[54] SINGLE-LINE, PLUG-IN TELEPHONE ANSWERING MACHINE

[76] Inventor: Kapali Eswaran, 750 Kings Mountain Rd., Woodside, Calif. 94062

[21] Appl. No.: 151,424

[22] Filed: Feb. 2, 1988

[51] Int. Cl.⁴ .............................................. H04M 1/65
[52] U.S. Cl. ...................................... 379/67; 379/76; 379/77
[58] Field of Search ...................... 379/77, 67, 88, 89, 379/76

[56] References Cited

U.S. PATENT DOCUMENTS

| | | | |
|---|---|---|---|
| 4,518,827 | 5/1985 | Sagara | 379/88 |
| 4,571,458 | 2/1986 | Bond | 379/77 |
| 4,596,901 | 6/1986 | Hanscom et al. | 379/76 |
| 4,617,425 | 10/1986 | Nakamura et al. | 379/77 |
| 4,654,485 | 3/1987 | Yamamoto | 379/73 |

Primary Examiner—Thomas W. Brown
Attorney, Agent, or Firm—Allston L. Jones

[57] ABSTRACT

An answering machine with one or more special features. These features include either means for providing multiple out-going messages, or multiple in-coming message locations, or both, with the message locations being selectable by the caller by means of preselected code sequences entered by the owner. When both portions of the present invention are present there are two sets of code sequences, one for out-going messages and another for in-coming messages. The number of digits in each code sequence can be the same or different, as can the actual codes since the detection of the proper code is time dependent on where in the cycle of the answering sequence the answering machine is at the time that the caller enters the code sequence.

19 Claims, 14 Drawing Sheets

SINGLE-LINE, PLUG-IN TELEPHONE ANSWERING MACHINE

BACKGROUND OF THE INVENTION

The present invention relates to single line, plug-in telephone answering machines, more particularly single line, plug-in answering machines having recording means with multiple outgoing message capability and multiple incoming message recording devices or locations.

There are several types of single line, plug-in answering machines currently available in the marketplace. The machines typically have two tape drives: one for the outgoing message (OGM), and the other for recording incoming messages from callers (ICM). In each of these machines, the user records his own OGM on one tape, which is typically a continuous loop tape. Then, when the telephone to which the machine is connected is not answered, the OGM tape is activated playing the tape to the caller. At the end of the OGM, a beep is sounded to alert the caller to the starting of the second tape, the ICM tape, to permit the caller to leave a message.

Each subsequent caller also hears the OGM and is permitted to leave a message which is recorded serially after all of the previously left messages. The machine then places an end of message marker after the message, turns off the ICM tape after each caller's recorded message and resets the OGM tape to the beginning for the next caller.

These machines also permit the user to rewind the ICM tape and to play back the messages. Many of the machines also have standard tape recorder functions such as fast-forward, erase, cue to next message, volume control, etc.

There are also multi-line telephone answering systems which are computer controlled. These systems are capable of receiving calls on numerous lines, some systems with a different recorded out-going message for each line. Additionally, the system can provide a number of secondary out-going messages that can be addressed by informing the caller of the code number to enter from the caller's keypad on their touch-tone phone in the initial out-going message. A form of this system is used by banks and credit unions to permit customers to determine their balances and obtain other information about the serives offered by the institution. For example, an account holder can call the bank, then in response to the initial out-going message enter a code to access the checking account balance sub-routine, enter his account and personal identification numbers, and hear a voice synthesizer tell him his account balance. In these systems the voice recording and transmission are all done digitally and the computer that is controlling the system processes the information in parallel so that the time necessary to deal with the system by any one caller seems to the caller to be as if he is the only caller using the system. These systems are very complex, memory intensive, and require sophisticated software to perform the desired functions. As such, these systems are also very expensive.

It would be desirable to have a single line, plug-in telephone answering machine that could provide different OGM messages for different callers in response to the caller entering a code sequence from a touch-tone telephone without the need of a sophisticated software system. The code sequence could be selected from internally available codes by, or a code entered by, the user. Additionally, it would be useful to have the capability of having the caller, again from the touch-tone panel of his telephone, to enter a code sequence to select the party for whom the message that he wishes to leave is for. The entry of that code would then activate the ICM tape associated with that code. The present invention provides such a single line, plug-in answering machine.

SUMMARY OF THE INVENTION

In accordance with the illustrated embodiments, the present invention provides a single line, plug-in answering machine with one or more special features. These features include either means for providing multiple out-going messages, or multiple in-coming message locations, or both, with the message locations being selectable by the caller by means of preselected code sequences.

More specifically, if the answering machine hase multiple out-going message capability, there will be a general out-going message means for providing a general message to all callers with that message having been previously recorded by the owner, and at least one special out-going message means for providing a special message to a caller following the general message and the entry by the caller of the corresponding code sequence by means of the caller's telephone with the special message and code sequence having been previously recorded and stored by the owner. Additionally, there is a means for recording the general and special out-going messages by the owner, a means for storing the code sequences for the special out-going messages entered by the owner, a means for receiving and decoding code sequences from the caller to select special out-going messages, and a means for comparing the stored code sequences with the caller entered code sequences and activating the corresponding special out-going message when a match of the stored and caller entered code sequences is found. In the context of this discussion, the term "at least one of" means a countable number. In the common usage of the term "countable" it is understood to include both one and a multiplicity of whatever is being specified.

Similarly, if the answering machine has capability for recording in-coming messages in different locations there will be at least one special in-coming message means for providing a caller a location to leave a special message following the entry by the caller of a corresponding code sequence by means of the caller's telephone with the code sequence having been previously selected and stored by the owner, and a defaul in-coming message means for providing a general message area for callers to leave a message if the caller does not enter a recognized code sequence. Additionally, there is a means for playing back the default and special in-coming messages by the owner, means for storing the code sequences for the special in-coming message areas by the owner, means for receiving and decoding code sequences from the caller to select special in-coming messages areas, and means for comparing the stored code sequences with the caller entered code sequences and activating the corresponding special in-coming message locations when a match of the stored and caller entered code sequences is found.

When both portions of the present invention are present there are two sets of code sequences, one for outgoing messages and another for in-coming messages. The number of digits in each code sequence can be the same or different, as can the actual codes since the detection of the proper code is time dependent on where in the cycle of the answering sequence the answer machine is at the time that the caller enters the code sequence.

DESCRIPTION OF THE PREFERRED EMBODIMENTS

Figure 1A:
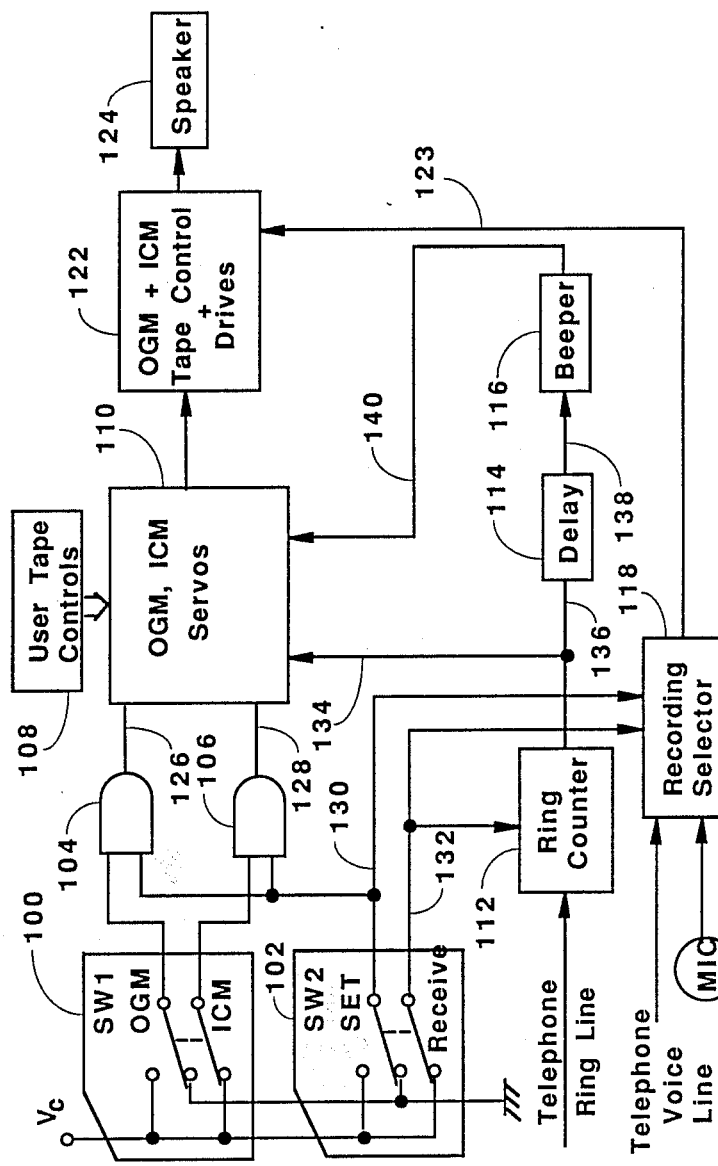
FIG. 1A is a block diagram of a basic telephone answering machine implementation.

FIG. 1A shows a block diagram of a typical telephone answering machine. A first switch 100, the tape selection switch, is provided for the user to manually select between the tape drives having the OGM and the ICM tapes. This is a ganged switch such that when both switch halves are in the down position the ICM is selected, and when in the up position the OGM is selected. The position of switch 100 controls all of the functions with respect to the tape drives so that all of the controls, manual and automatic, only control the selected tape as will be seen in the discussion of FIG. 1B.

Similarly the second switch 102, the mode selection switch, is provided for the user to select between the "set" and "receive" modes of operation of the answering machine. When both of the ganged switches 102 are in the down position the "receive" mode is selected, and when they are in the up position the "set" mode is selected. The "set" mode is provided for the owner of the answering machine to record an OGM or to listen to recorded ICMs. The "receive" mode is the usual mode of operation to allow the answering machine to record ICMs when the owner does not answer the telephone within a preselected number of rings.

The OGM and ICM terminals of switch 100 are each connected to one input terminal of a different one of AND gates 104 and 106, with the other input terminal of each of AND gates 104 and 106 connected to the "set" terminal of switch 102. Thus, when the "set" mode has been selected, the logic level on the output terminals 126 and 128 of AND gates 104 and 106 are mutually exclusive of each other, i.e. one is a logical high and the other is a logical low depending on the position of switch 100. Device 110 represents the OGM or ICM servo which has built in an ICM servo mechanism and an OGM servo mechanism. The logical high signal from AND gate 106 on line 128 arms ICM servo mechanism in servo 110. When so armed, user tape controls 108 allow the owner to rewind the ICM tape and listen to or to erase any recorded messages when switch 100 is in the ICM position. The logical high signal on line 126 arms OGM servo mechanism on servo 110. When so armed user tape controls 108 allow the owner to record, play or erase the OGM. The "set" mode terminal of switch 102 is also connected to recording selector 118 to permit the owner to record a message via microphone 120.

When switch 102 is in the "receive" mode, ring counter 122 is enabled to count the number of rings on the telephone line. If the number of rings equals to preselected number, ring counter 112 enables the OGM servo 110 via the signal on line 134. This in turn initiates the playing of the OGM by means of control 122. The signal from ring counter 112 is also applied to a delay 114 that is equal to or longer than the length of the OGM. The output signal from delay 114 then activates beeper 116 which the caller hears in the telephone while the beep signal activates the ICM servo 110 and control 122 to record the caller's message via recorder selector 118.

Figure 1B:
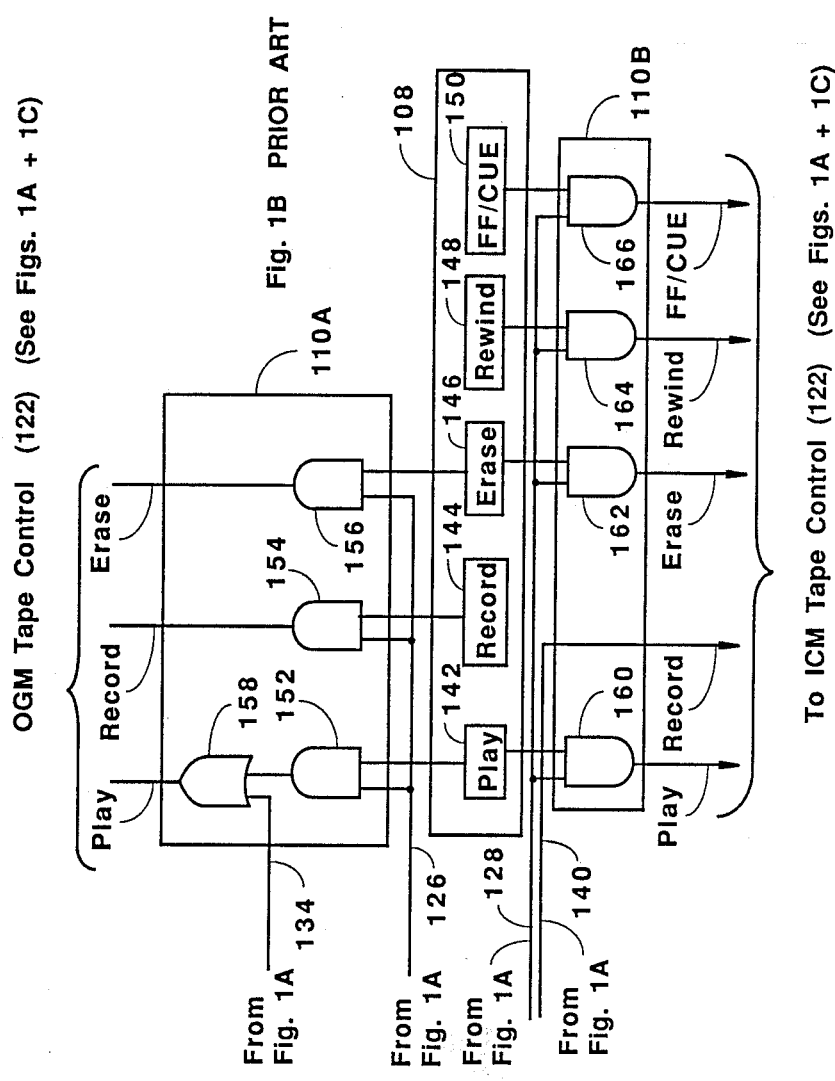
FIG. 1B is a bloci diagram of the user tape controls and the OGM and ICM servos of the block diagram of FIG. 1A.

Referring next to FIG. 1B, the user tape controls 108 and the OGM and ICM servos 110 are shown in more detail. User tape controls 108 consists of a set of five push buttons 142-150 for controlling "play", "record", "erase", "rewind" and "ff/cue" functions of the tape drives. Note that only the first three of these operations are possible for the OGM tape, while all but the "record" function are available for the ICM tape. When depressed, each of these switches momentarily applies a positive pulse to the output line therefrom. The OGM portion of servos 110 is shown at the top of the figure and is labelled 110A, while the ICM portion of servos 110 is shown at the bottom of the figure and is labelled 110B.

OGM servo 110A includes three AND gates 152-156 and an OR gate 158. An input terminal of each of AND gates 152-156 are connected to line 126 (the output line from AND gate 104) of FIG. 1A to enable the OGM servo 110A. The second input terminal of each of AND gates 152-156 are connected to switches 142-146 ("play", "record" and "erase"), respectively. The output terminals of AND gates 154 and 156 are connected directly to the appropriate input line of OGM tape control 122, the output terminal of AND gate 152 is connected to the OGM tape control 122 via OR gate 158. The second input terminal of OR gate 158 is connected to line 134 (output of ring counter 112) of FIG. 1A to allow the playing of the OGM either manually or automatically.

The ICM servo 110B includes four AND gates 160-166, which are used as enabling gates, with each having one of its input terminals connected to line 128

(output of AND gate 106) of FIG. 1A to enable it. The second input terminal of AND gates 160-166 is connected to the corresponding one of switches ("play", "erase", "rewind" and "ff/cue") 142 and 146-150. The output terminals of AND gates 160-166, together with line 140 (output line from beeper 116) from FIG. 1A that is the "record" input line, are connected to ICM tape control 122.

Figure 1C:
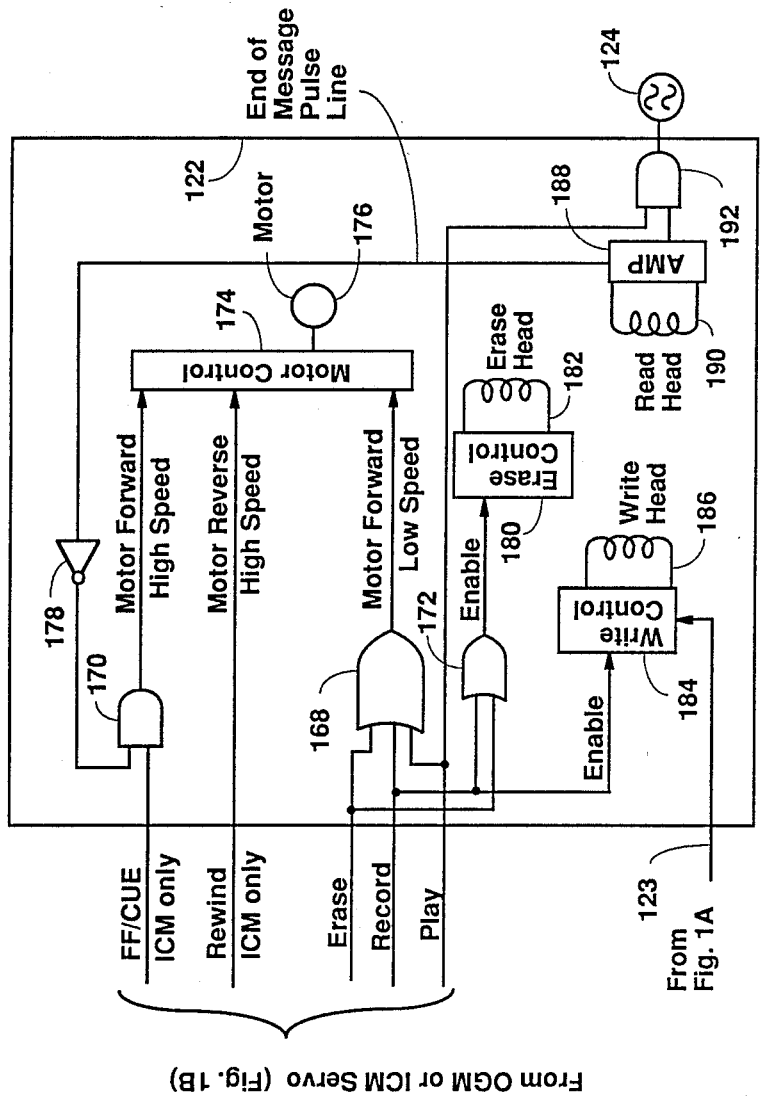
FIG. 1C is a block diagram of a representative one of the OGM and ICM control and drive circuits of FIG. 1A.

Next, FIG. 1C shows one of the control and drives of control and drive 122 in greater detail. For the ICM control and drive there are six input lines, and for the OGM control and drives there are four input lines. The "ff/cue" and "rewind" signals only have application with the ICM tape. In both versions, the "erase", "record" and "play" signals are applied to an OR gate 168 to provide the "motor forward-low speed" enable signal to motor control 174 for operating transport motor 176. Additionally, the "erase" and "record" signals are applied to a second OR gate 172 to generate the enable signal for the erase control 180 for powering erase head 182. The "record" signal serves as an enable signal for write control 184 which receives the information to be written to tape on line 123 from recording selector 118 in FIG. 1A that is applied to write head 186. The "play" signal is also applied to AND gate 192 to gate the output signal from amplifier 188, which amplifies the signal that is read from the tape by read head 190, to speaker 124 so that the owner can review the OGM or to listen to the ICMs. The ICM control and drive also includes the use of an end message signal which is applied to one input terminal of AND gate 170 via inverter 178. The other input terminal of AND gate 170 receives the "ff/cue" signal and the output signal of AND gate 170 provides a "motor forward-high speed" signal to motor control 174. Thus, when the owner presses the "ff/cue" button 150 (FIG. 1B) the tape is advanced at high speed until the amplifier detects an end of message marker on the tape. At that time the end of message signal is generated, inverted by inverter 178 and AND gate 170 is disabled stopping the forward advance of the tape by removing the "motor forward-high speed" signal from motor control 174.

The present invention has two parts which can be used together or separately. The first part provides a system whereby there can be more than one OGM. A general OGM is provided for all callers and upon entry of a preselected code number via a touch tone key panel an additional OGM can be heard. The additional OGMs can be either public or private depending on where an announced code is used or a code that is only known to the owner and the desired caller. A caller who is to have access to a private message could have been told previously by the owner what code to use, or the caller could be told in the general OGM to punch in a selected sequence of digits from a sequence of digits known to both the owner and the caller, e.g. the second, third, fourth and fifth digits of the caller's telephone number. The second part of the idea is provision for multiple recording locations for ICMs. To select other than a default ICM location, the caller would enter an announced code number from a touch tone panel when the leave a message beep is heard. In either of these parts, the codes are dynamically definable and alterable by the owner of the answering machine which incorporates the present invention.

Figure 2:
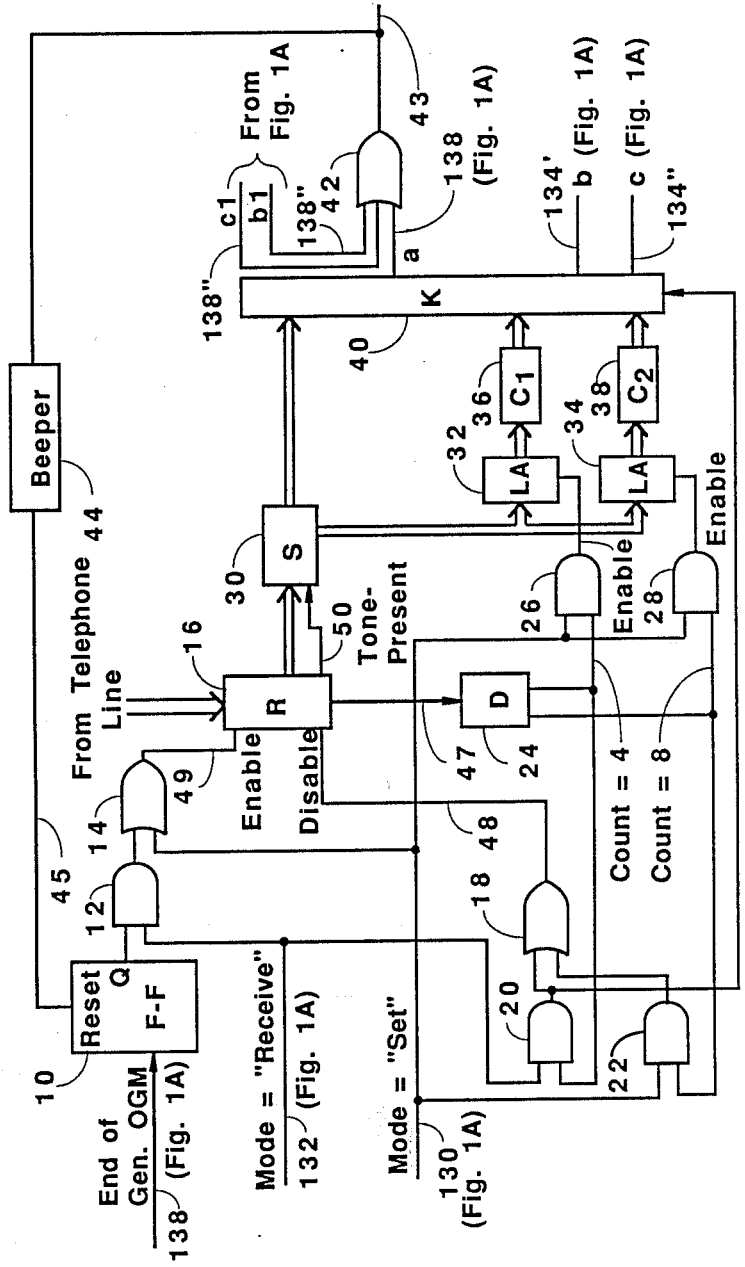
FIG. 2 is a logic block diagram of the control circuitry for selecting between 3 OGMs of a telephone answering machine of the present invention.

In FIG. 2 there is shown a logic block diagram of the circuit of the present invention to provide two OGMs in addition to the general OGM. This circuit is inserted in place of line 138 in FIG. 1A with the output signal of delay 114 applied to flip-flop 10 and the output line 43 going to beeper 116. With selection switch 102 (FIG. 1A) in the "set" position the owner of the answering machine can program the codes to activate each of the additional OGMs. In the "set" mode a logical high signal is applied to OR gate 14 to provide a logical high enable signal on line 49 to recognizer R, 16. The owner then lifts his telephone receiver and enters the code number for the second OGM. Recognizer 16 (e.g. DTMF receiver M-947 by Teltone) decodes the keyed tones entered and generates a four bit digital word which is transferred to register S, 30. The circuit of FIG. 2 is shown to have four digits for each code being entered by the owner, however, a code of any length can be used with appropriate modifications to the circuit. Recognizer 16 also provides a shift signal on line 50 to register 30 and a tone-present signal on line 47 to director 24 (described below). When director 24 counts four tone-present signals from recognizer 16, a logical high signal is applied to one of the input terminals of AND gate 26 which has the "set" signal on its other input terminal. AND gate 26 in turn applies an enable signal to logic array 32 (described below) to gate the code sequence stored in register 30 to register C1, 36. Similarly, the next four digit codes entered by the owner are decoded by recognizer 16 and entered into register 30. When director 24 counts the next four tone-present signals from recognizer 16, director 24 applies a signal to one input terminal of AND gate 28 which has the "set" signal on its other input terminal. The output signal from AND gate 28 then enables logic array 34 (same as logic array 32) which permits the second code stored in register 30 to pass to register C2, 38, completing the programing of the circuit to allow for activation of the second and third OGMs.

By placing selection switch 102 in the "receive" position, a logical high signal is applied to one of the input terminals of each of AND gates 12 and 20, and a low logical signal on the mode="set" line. In operation, when the end of general OGM signal (the first end of OGM signal) is applied to flip-flop 10, a logical high signal is applied to the other input terminal of AND gate 12. AND gate 12 in turn applies a logical high signal to OR gate 14 and generates an enable signal to recognizer 16. The caller then may enter a four digit code from the key panel of his touch tone telephone which is decoded by recognizer 16. As the entered code is decoded it is passed to register 30 as discussed above, and the tone-present signal is counted by director 24. When the signal on the "count=4" output line of director 24 goes high, that signal is applied to the other input terminal of AND gate 20. AND gate 20 in turn applies a logical high signal to OR gate 18 which generates the disable signal on line 48 that is applied to recognizer 16. The output signal from AND gate 20 is also utilized as the actuate signal to comparator K, 40 (described below). Comparator 40 then compares the code stored in register 30 with each of the codes prestored by the owner in registers 36 and 38. If no match is found or if a match is found with both the codes in registers 36 and 38, then comparator 40 generates a logical high signal on line "a". If a match is found with the code only in register 36 or only in register 38, a logical high signal is generated by comparator 40 on lines "b" or "c", respectively. A signal on either line "b" or "c" results in the actuation of the respective OGM. Each of lines "b" and "c" are equivalent to line 134 in FIGS. 1A and 1B. Each of lines "b1" and "c1" are equivalent to line 138 of FIG. 1A. Lines a, b1 and c1 are input lines to OR gate 42. The output signal from OR gate 42 is applied to a second beep generator 44 to generate a second end of OGM beep to signal the caller to leave a message. The output signal on line 45 of second beeper 44 is utilized to reset flip flop 10.

While the above discussion has been for a system having a total of three OGMs, it should be noted that the system can easily be expanded to include as many OGMs as desired.

Figure 3:
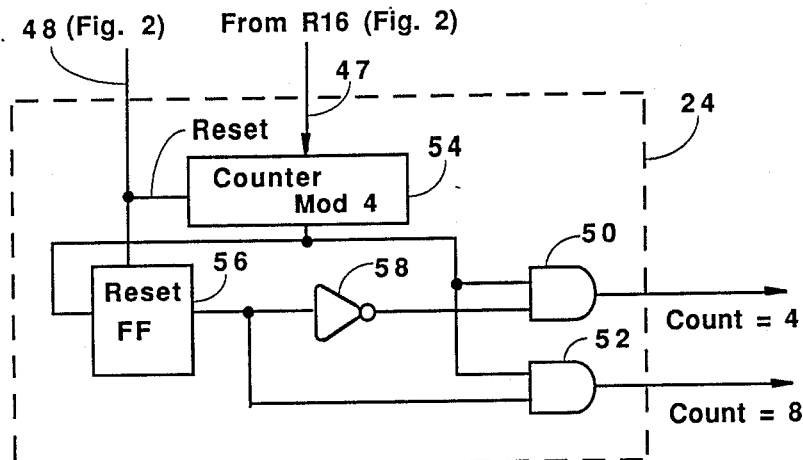
FIG. 3 is a logic block diagram of the director block of FIG. 2.

FIG. 3 shows a logic block diagram of director 24. Included is a modulo 4 counter 54 to count the tone-present signals from recognizer 16 on line 47. A count of 4 signal from counter 54 is applied to flip-flop 56, which toggles each time a four count is received, and one input terminal on each of AND gates 50 and 52. The output terminal of flip-flop 56 is connected to inverter 58 and the other input terminal of AND gate 52. The other input terminal of AND gate 50 is connected to the output terminal of inverter 58. In this configuration, when the first four signals are counted, the output signal of AND gate 50 becomes a logical high and the output signal of AND gate 52 is a logical low. When the next four signals are counted, the output signal of AND gate 52 becomes a logical high and the output signal of AND gate 50 is a logical low. The signal on line 48 is high when the count is 4 in the "RECEIVE" mode. It is also high when the count is 8 in the "SET" mode. The signal on line 48 is used to reset the counter and flip flops in FIG. 3.

Figure 4:
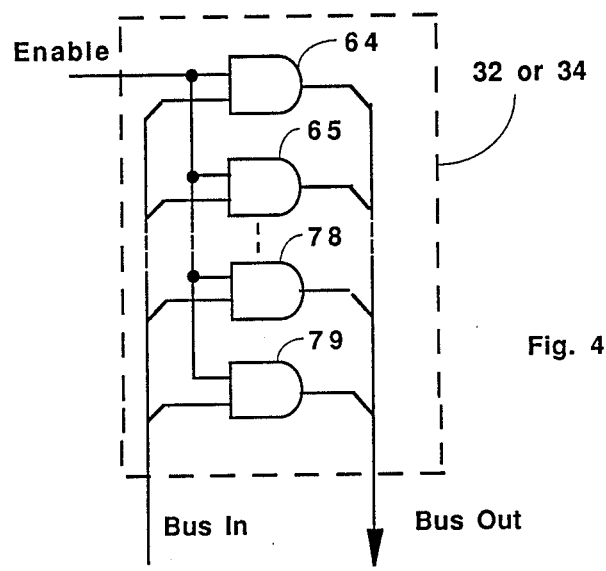
FIG. 4 is a logic block diagram of the logic array blocks of FIG. 2.

Logic arrays 32 and 34 are shown in FIG. 4 where it can be seen that sixteen two input AND gates 65-79 are each enabled by the same signal to transfer each sixteen bit code in parallel to the appropriate register (four bits per tone with four tones in all).

Figure 5:
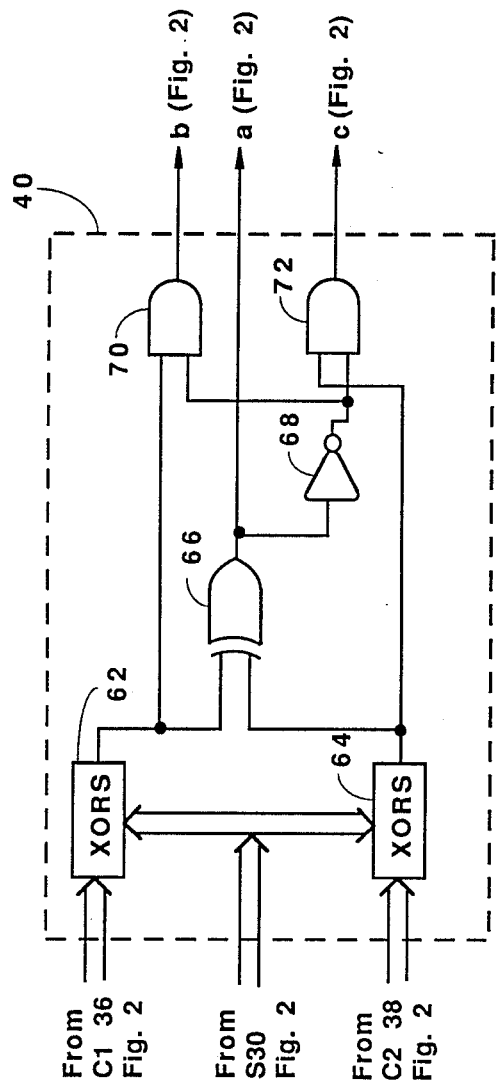
FIG. 5 is a logic block diagram of the comparator of FIG. 2.

In FIG. 5 comparator 40 is shown in logical block diagram form. Comparator 40 includes two banks of exclusive OR gates 62 and 64 for comparing all of the bits of each of the codes of registers 36 and 38 with all of the bits of the code in register 30. Each of the match-no-match signals from exclusive OR gates 62 and 64 are applied to different input terminals of exclusive OR 66 and to one input terminal of the two AND gates 70 and 72. The output terminal of exclusive OR 66 provides the "a" line. The output signal from exclusive OR 66 is applied to an inverter 68 and the output signal from inverter 68 is in turn applied to the other input terminals of each of AND gates 70 and 72. The output terminals of AND gates 70 and 72 provide the "b" and "c" lines, respectively.

The following paragraphs describe an implementation for the second part of the invention, namely the provision for multiple devices for ICMs. The next paragraph describes an implementation when only one OGM is used and the subsequent paragraph describes an implementation when there are multiple OGM devices. Both of the implementation are described in reference to FIG. 6.

Figure 6:
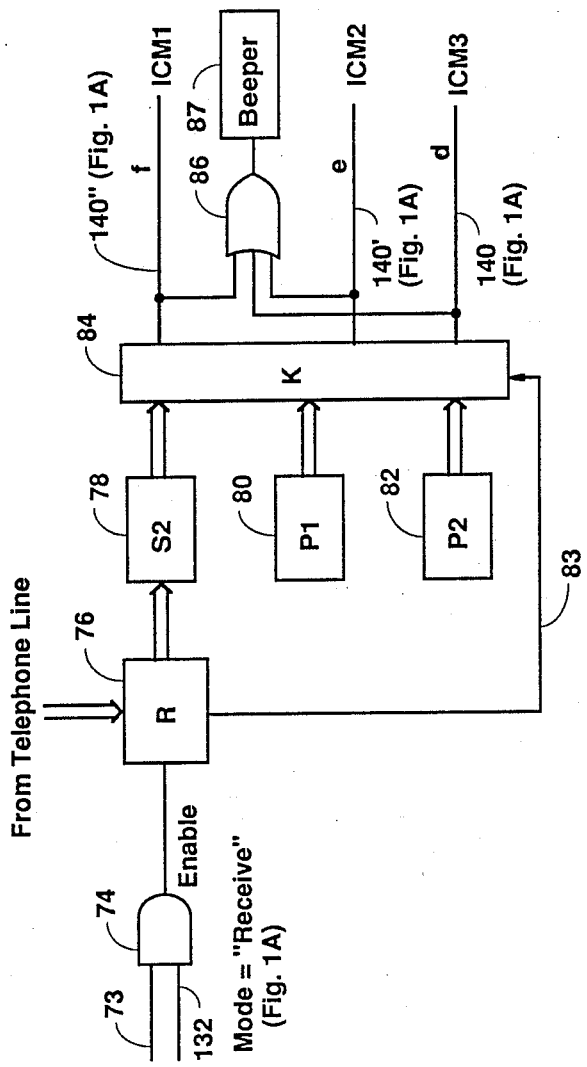
FIG. 6 is a logic block diagram of the control circuitry for selecting between 3 ICM recording locations of a telephone answering machine of the present invention.

Now refer to FIG. 6 for the following. The input signal on line 73 is the end of General OGM signal which is the signal on line 138 in FIG. 1A. This signal is the input signal on line 73 of AND gate 74 and the other input signal is the "RECEIVE" signal from the selection switch on line 132 (FIG. 1A). When both of these signals are a logical high, the output signal of AND gate 74 is also a logical high and provides the enable signal for a second recognizer 76 (this is the only recognizer in the single OGM configuration and the second recognizer in the multiple OGM configuration; it will be referred to as the second recognizer below). In the outgoing message, the caller would have been informed to key in a code (which is assumed for illustration to be a single symbol digit in the key panel of a touch tone telephone) upon hearing the beep tone. Here, recognizer 76 is in the enabled state when the beeper has sounded the tone (beeper 116 of FIG. 1A). When the caller enters a code symbol in his key panel, the signals are received and gated to recognizer 76 which has been enabled. The signals are decoded by recognizer 76 and a corresponding code is transferred to register 78. At this time, recognizer 76 also activates comparator 84 via line 83. Next, comparator 84 (similar to comparator 40 in FIG. 2) compares the code stored in register 78 with the codes previously entered by the owner in dip switch registers P1 and P2 (80 and 82). If there is no match or if there is a match with both the registers 80 and 82, then signal "d" appears. If there is a match between register 78 and register 80 only, then signal "e" appears. If there is a match between register 78 and register 82 only, then signal "f" appears. Signal "d" activates ICM3 (i.e., signal "d" is the same as the signal on line 140 of FIG. 1A except that it is specifically for ICM3). Signal "e" activates ICM2 (i.e., signal "e" is the same as the signal on line 140 of FIG. 1A except that it is specifically for ICM2). Signal "f" activates ICM1 (i.e., signal "f" is the same as the signal on line 140 of FIG. 1A except that it is specifically for ICM1). Each of the signals "d", "e" and "f" are also inputted to an OR gate 86 for arming a beeper 87 (this is the second beeper in the single OGM configuration and the third beeper in the multiple OGM configuration; it will be referred to as the third beeper below) which signals the caller to leave a message. The first beeper 116, in the one OGM configuration, sounds to alert the caller to input a code for choosing a specific input device (either ICM1 or ICM2 or ICM3) and the third beeper 87, in the one OGM configuration, beeps to alert the caller to leave a message. With this portion of the present invention, the owner, as part of his outgoing message, may state the various codes that the caller may input to choose an area set aside for a particular person at the receiving end. For example, the owner might state in the OGM message that following the beep after the message, if the caller wanted to leave a message for salesperson Mr. Smith then enter code 2 and wait for a beep to start leaving a message, for salesperson Mrs. Peterson then enter code 4 and wait for a beep to start leaving a message and for any other person enter any other code or no code and wait for a beep to start leaving a message.

This paragraph discusses an implementation of the second invention when multiple OGM and ICM devices are both included in the answering machine. The machine will have three beepers: one sounds after the playing of the general message informing the caller to input a specific code for a possible special message in an OGM, the second after the playing of a specific message on a specific OGM1 or OGM2 and informing the caller to input a specific code for a possible selection of a special recording device ICM1 or ICM2 and the third beeper sound informing the caller to start leaving a message. The second recognizer 76 shown in FIG. 6 is similar to the recognizer in FIG. 2. The third beeper 87 is similar to first and second beepers 116 and 44. In FIG. 6, the input signal on line 73 is the signal from beeper 44, line 45, in FIG. 2. The rest of the operation is the same as that described in the previous paragraph.

With both of the features of the present invention implemented, the owner, as part of his outgoing message, may state the various codes that the caller may input at the end of a first beep tone to choose to listen to a specific message depending on the caller, the codes that the caller may input at the end of a second beep to choose an area set aside for a particular person at the receiving end. For example, the owner might state in the general OGM message that following the beep after the general message, if the caller was Mr. Fine or Mr. Gold, then he may input the first four digits of the caller's home phone number to listen to a particular message and if the caller wanted to leave a message, then the caller should wait for the second beep to enter a code for the called person; if the called person was salesperson Mr. Smith then enter code 2 and wait for a beep to start leaving a message, for salesperson Mrs. Peterson then enter code 4 and wait for a beep to start leaving a message and any other person enter any other code or no code and wait for a beep to start leaving a message.

As can be seen in the discussions of the various implementations, there are several logical AND, OR, NOT and XOR functions performed. There are also multiple registers involved, namely S, C1, C2, S2, flip-flop 10, and flip-flop 46. There are also a counter 44 and comparators 40 and 84. The functions performed by these elements can be done by a simple microprocessor. Only one recognizer is needed. This paragraph describes such an implementation. The following describes an implementation when both the features with multiple OGMs and ICMs are installed in the machine. When only one of the features is installed, the implementation can easily be extrapolated.

Figure 7:
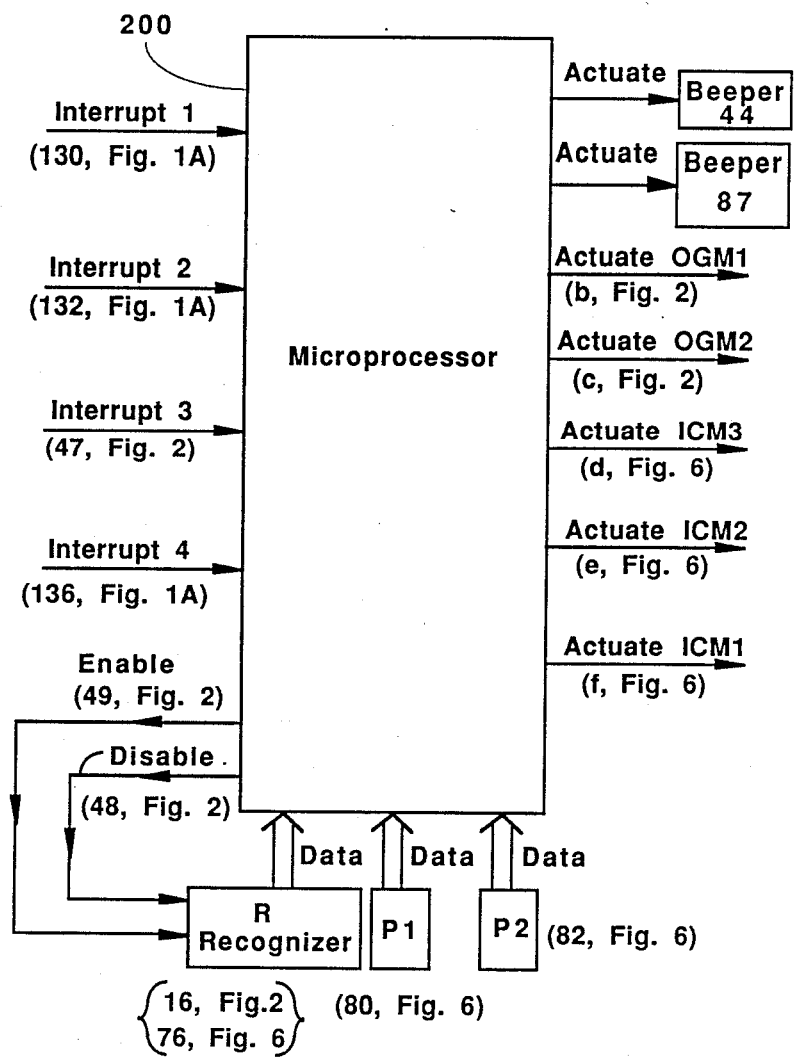
FIG. 7 shows a microprocessor implementation of the present invention.
Figure 8A:
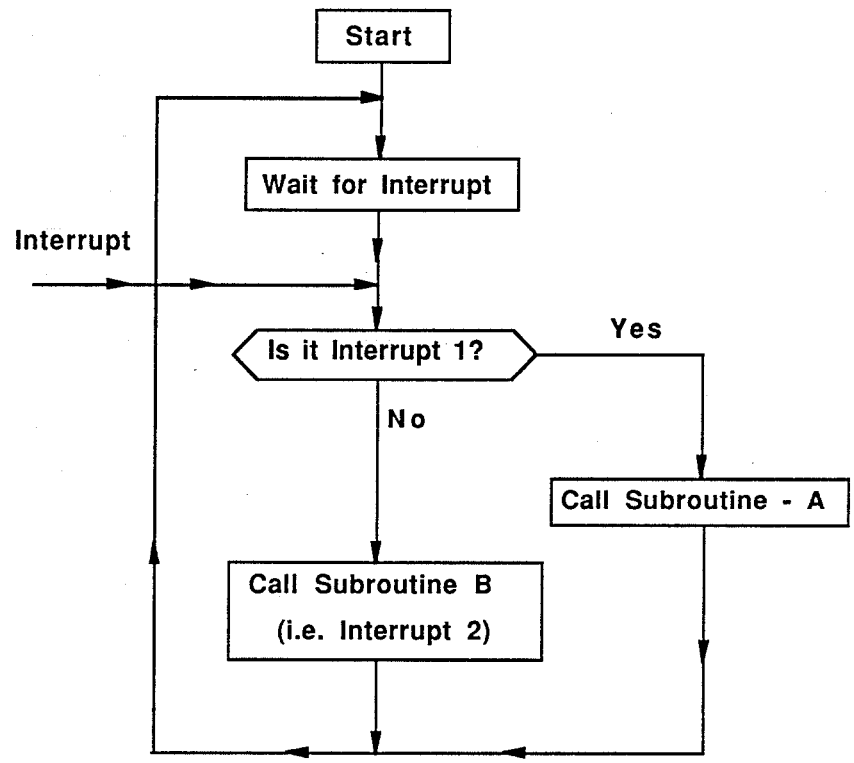
FIG. 8A-E are flow charts for the operation of the microprocesor embodiment of FIG. 7.
Figure 8B:
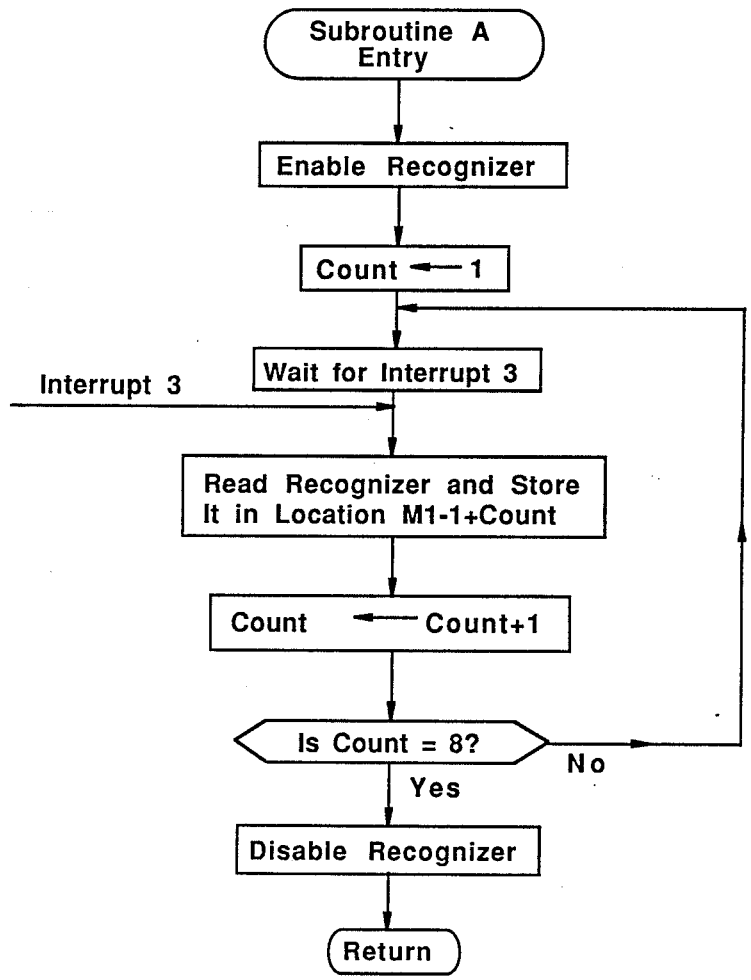
Figure 8C:
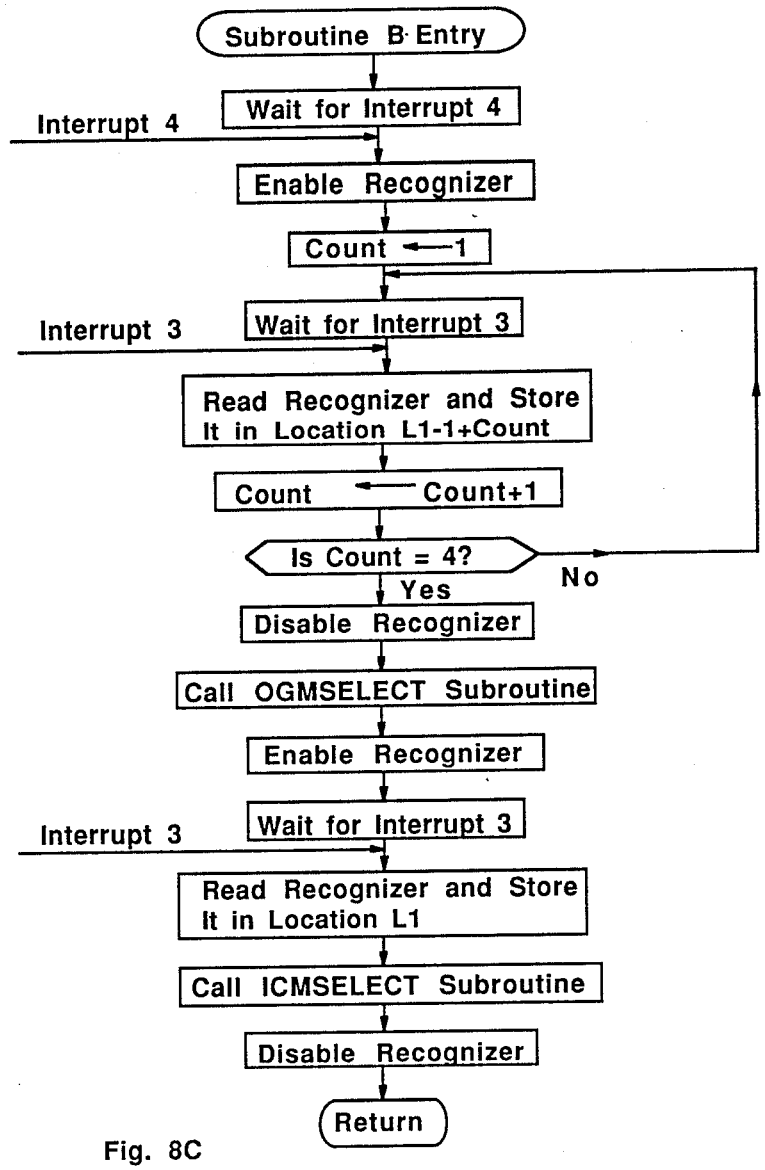
Figure 8D:
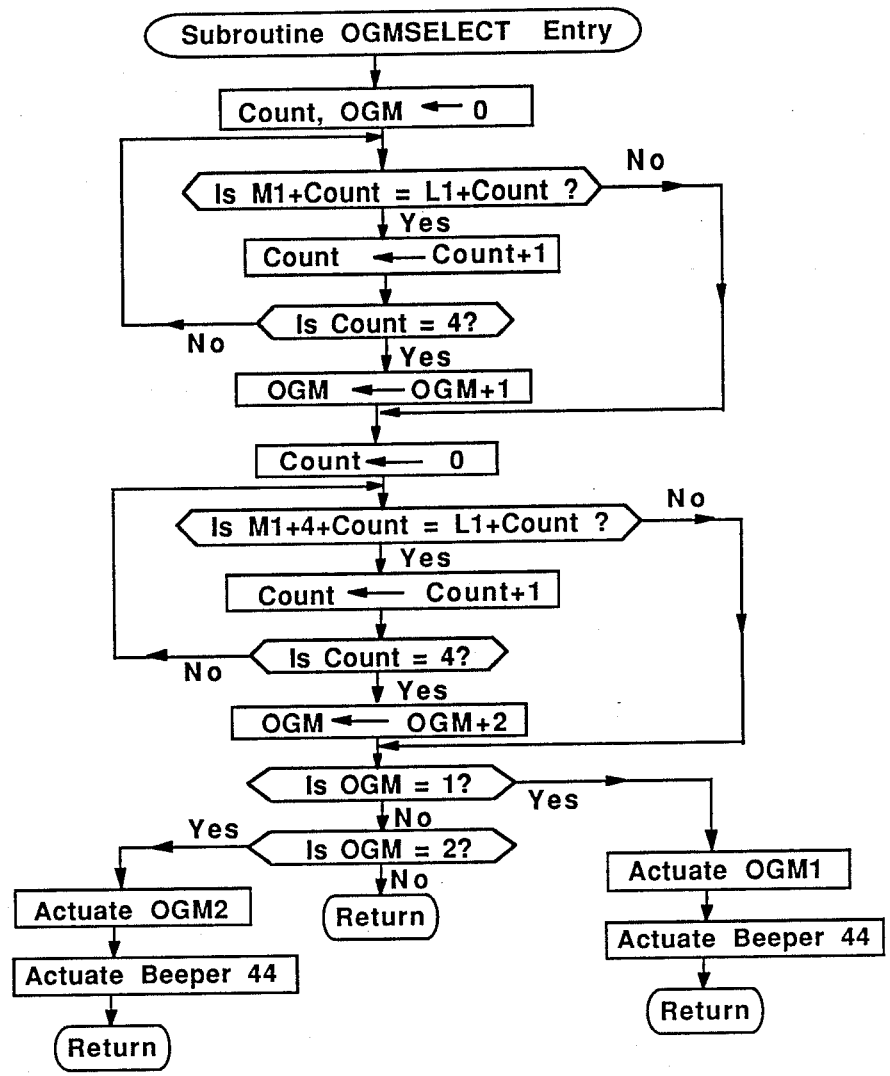
Figure 8E:
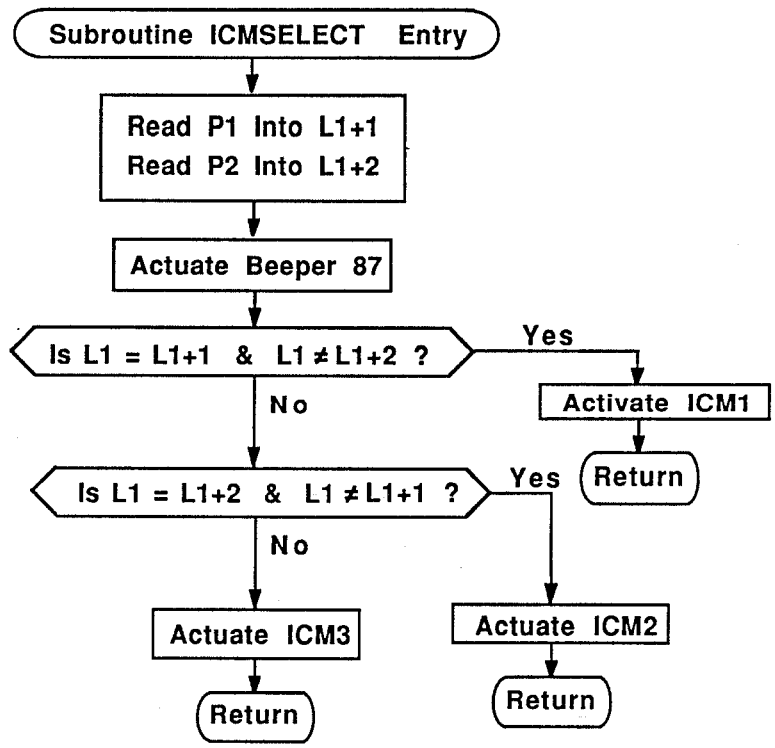

The system can be interrupt driven; four interrupts in all: interrupt 1 occurs when the selection switch is turned to the "SET" position; interrupt 2 occurs when the selection switch is turned to "RECEIVE" position; interrupt 3 occurs when the recognizer sends a tone-present signal, and interrupt 4 occurs when the ring-counter has counted a preset number of rings. The interrupt 1 line is same as line 130 in FIG. 1A. The interrupt 2 line is same as line 132 in FIG. 1A. The interrupt 3 line is same as line 47 in FIG. 2. The interrupt 4 line is same as line 136 in FIG. 1A. FIG. 7 shows and implementation using a microprocessor 200. There are four interrupt control line as input lines. The data inputs are from the recognizers and dip switches. There are seven output control lines. Two of these actuate two of the beepers, one to alert the caller to input a code (which is a single symbol) to select an ICM device and the other to alert the caller to input a message. Two of these output lines are used to actuate the appropriate OGM device. Three of these output lines are used to actuate the appropriate ICM device. There are also two more output lines to enable and disable the recognizer. In FIG. 7, these output lines are marked with line numbers that are equivalent to previous reference numbers in other figures involving implementations without a microprocessor. FIGS. 8A through 8E show a flowchart of the functioning of the microprocessor program logic. Memory locations are assumed to be 4 bits wide and eight locations M1 through M8 are used to store codes for caller (it is assumed, as before, that the caller codes are 4 symbols long and that there are two special callers with particular messages; receiver code is 1 symbol long and there are two special receivers). Locations L1 through L4 and COUNT, OGM are scratch locations used to store temporay values.

Figure 9A:
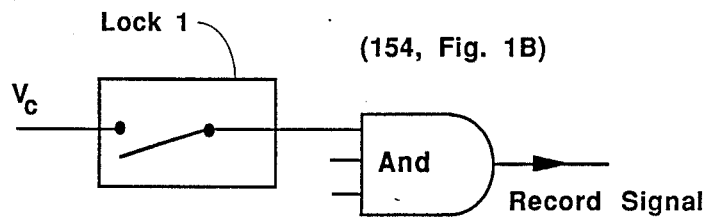
FIG. 9A illustrates one locking scheme for providing privacy in monitoring the different message tapes in the present invention.
Figure 9B:
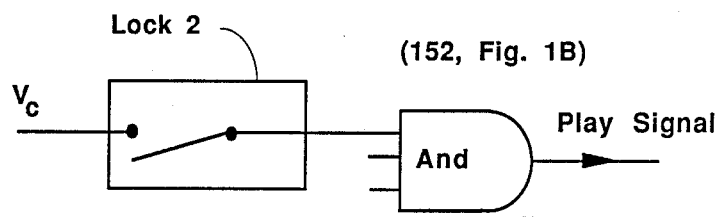
FIG. 9B illustrates another locking scheme for providing privacy in monitoring the different message tapes in the present invention.

When multiple devices for outgoing and incoming messages are involved, it might be desirable to have a mechanism to ensure privacy. For example, only Mr. Adam might have the authority to enter messages in the OGMs and Mr. Peterson was to receive messages in ICM1, Mrs. Doe was to receive messages in ICM2 and the rest of the personnel in ICM3. In such instances, one could provide a lock and key mechanism to ensure privacy. FIGS. 9A and 9B show such schemes. There can be a separate lock mechanism for each ICM and OGM device for which privacy is required. When the key is used to open the lock and with the key still in the lock, an output signal is created which provides an input signal to the appropriate AND gate connected to signals from "PLAY" or "RECORD" buttons. The output of the AND gate is connected to the respective servos. For each of these schemes, FIGS. 9A and 9B show the substitution of a three input AND gate for AND gates 154 and 152 in FIG. 1B with the third input line connected to $V_c$ through a spring loaded lock.

It should be understood that the present invention is not limited to having only three OGMs or ICMs, and that the circuitry shown here can easily be expanded to accommodate as many of either as may be desired. It is also not necessary that there be as many OGMs as there are ICMs. In the above discussion the recording medium referred to was magnetic tape. The present invention could also utilize diskettes or IC memory (RAM). For the tapes and diskettes the recording could be done either digitally or analog, and digitally in the RAM. Also wherever in the discussion multiple tapes were mentioned, there could actually be multiple tapes, or other recording medium, or there could be a single physical recording medium with the individual messages separated by magnetic or data markers. This is true for either the OGM or the ICM tapes, in fact, with appropriate markers, the could all be on the same recording medium. Additionally, one skilled in the art could implement the system of the present invention that has multiple ICM and OGM means with a single recognizer (e.g. see FIG. 7) instead of the two recognizers shown in FIGS. 2 and 6.

Further, from the foregoing description, it will be apparent that the invention disclosed herein provides a novel and advantageous answering machine design. As will be understood by those familiar with the art, the invention may be embodied in other specific forms without departing from the spirit or essential characteristics thereof. The scope of the present invention is limited only by the scope of the claims appended hereto.

What is claimed is:

1. A single line, plug-in telephone answering machine comprising:
    general out-going message means for providing a general message to all callers, said general message having been previously recorded by the owner;
    a countable set of special out-going message means for providing a special message to a caller following the general message and the entry by the caller of a corresponding code sequence by means of the caller's telephone, said special message and code sequence having been previously recorded and stored by the owner;
    means for recording the general and special out-going messages by the owner;

means for entry by the owner of an out-going message code sequence for each of said special out-going message means;

means for storing the code sequences for the special out-going messages entered by the owner;

means for receiving and decoding the code sequence from the caller to select the corresponding special out-going message; and means for comparing the stored code sequences with the caller entered code sequence and activating the corresponding special out-going message when a match of the stored and caller entered code sequences is found.

2. A telephone answering machine as in claim 1 wherein said means for entry by the owner of code sequences for special out-going messages includes a recognizer for decoding the tones from the owner's touch-tone telephone as the owner enters the selected code sequences from the telephone keypad.

3. A telephone answering machine as in claim 1 wherein said means for receiving and decoding a code sequence from the caller to select a special out-going message includes a recognizer for decoding the tones from the caller's touch-tone telephone as the caller enters the selected code sequence from the telephone keypad.

4. A telephone answering machine as in claim 1:

further including means for placing the answering machine in either a set or a receive code, in the set mode the owner can record the general and special out-going messages and select a code sequence for each special out-going message, and in the receive mode the answering machine will answer the telephone and accept code sequences from a caller; and wherein said means for entry by the owner of code sequences for special out-going messages and means for receiving and decoding a code sequence from the caller to select a special out-going message each share a recognizer for decoding the tones from the owner's or the caller's touch-tone telephone as the owner or caller enters a selected code sequence from the telephone keypad, with the recognizer being used in the set mode to decode the owner entered code sequences and in the receive mode to decode the caller entered code sequences.

5. A single line, plug-in telephone answering machine comprising:

a countable set of special in-coming message means for providing a caller a location to leave a special message following the entry by the caller of a corresponding code sequence by means of the caller's telephone, said code sequence having been previously selected and stored by the owner;

default in-coming message means for providing a general message area for callers to leave a message if the caller does not enter a recognized code sequence;

means for playing back the default and special in-coming messages by the owner;

means for entry by the owner of a special in-coming message code sequence for each of said special in-coming message means;

means for storing the code sequences for the special in-coming message means established by the owner;

means for receiving and decoding a code sequence from the caller to select a special in-coming message means; and means for comparing the stored code sequences with the caller entered code sequence and activating the corresponding special in-coming message location when a match of the stored and caller entered code sequences is found.

6. A telephone answering machine as in claim 5 wherein said means for entry by the owner of code sequences for special in-coming messages includes a recognizer for decoding the tones from the owner's touch-tone telephone as the owner enters the selected code sequences from the telephone keypad.

7. A telephone answering machine as in claim 5 wherein said means for receiving and decoding code sequences from the caller to select special in-coming message locations includes a recognizer for decoding the tones from the caller's touch-tone telephone as the caller enters the selected code sequences from the telephone keypad.

8. A telephone answering machine as in claim 5:

further including means for placing the answering machine in either a set or a receive mode, in the set mode the owner can select the code sequences for the special in-coming messages, and in the receive mode the answering machine will answer the telephone as well as accept messages and code sequences from a caller; and wherein said means for entry by the owner of code sequences for special in-coming message locations and means for receiving and decoding code sequences from the caller to select special in-coming messages each shares a recognizer for decoding the tones from the owner's or the caller's touch-tone telephone as the owner or caller enters the selected code sequences from the telephone keypad, with the recognizer being used in the set mode to decode the owner entered code sequences and in the receive mode to decode the caller entered code sequences.

9. A single line, plug-in telephone answering machine comprising:

general out-going message means for providing a general message to all callers, said general message having been previously recorded by the owner;

a countable set of special out-going message means for providing a special message to a caller following the general message and the entry by the caller of a corresponding out-going message code sequence by means of the caller's telephone, said special out-going message and special out-going message code sequence having bee previously recorded and stored by the owner;

means for recording the general and special out-going messages by the owner;

a countable set of special in-coming message means for providing a caller a location to leave a special message following the entry by the caller of a corresponding in-coming message code sequence by means of the caller's telephone, said in-coming message code sequence having been previously selected and stored by the owner;

default in-coming message means for providing a general message area for callers to leave a message if the caller does not enter a recognized special in-coming message code sequence;

means for playing back the default and special incoming messages;

means for entry by the owner of an out-going message code sequence for each of said special out-going message means, and for entry by the owner of a special in-coming message code sequence for each of said special in-coming message means;

means for storing the out-going message code sequences for the special out-going message means entered by the owner, and for storing the special in-coming message code sequences for the special in-coming message locations established by the owner;

means for receiving and decoding an out-going message code sequence entered by the caller to select the corresponding special out-going message, and for receiving and decoding a special in-coming message code sequence from the telephone of the caller to select the corresponding special in-coming message location; and means for comparing the stored out-going message code sequences with the caller entered out-going message code sequence and activating the corresponding special out-going message when a match of the stored and caller entered out-going message code sequences is found, and for comparing the stored special in-coming message code sequences with the caller entered special in-coming message code sequence and activating the corresponding special in-coming message locations when a match of the stored and caller entered special in-coming message code sequences is found.

10. A telephone answering machine as in claim 9 wherein said means for entry by the owner of code sequences includes a recognizer for decoding the tones from the owner's touch-tone telephone as the owner enters the selected code sequences from the telephone keypad.

11. A telephone answering machine as in claim 9 wherein said means for receiving and decoding a code sequence from the caller includes a recognizer for decoding the tones from the caller's touch-tone telephone as the caller enters a selected code sequence from the telephone keypad.

12. A telephone answering machine as in claim 9:
further including means for placing the answering machine in either a set or a receive mode, in the set mode the owner can record the general and special out-going messages and select a code sequence for each special out-going message, and in the receive mode the answering machine will answer the telephone and accept code sequences from a caller; and wherein said means for entry by the owner of code sequences and means for receiving and decoding a code sequence from the caller each shares a recognizer for decoding the tones from the owner's or the caller's touch-tone telephone as the owner or caller enters the selected code sequences from the telephone keypad, with the recognizer being used in the set mode to decode the owner entered code sequences and in the receive mode to decode the caller entered code sequences.

13. A telephone answering machine as in claim 9:
further including means for placing the answering machine in either a set or receive mode,
in the set mode the owner can record the general and special out-going messages and select the code sequences for the special out-going and in-coming messages, and in the receive mode the answering machine will answer the telephone, and accept in-coming messages and code sequences from a caller; and wherein:

said means for entry by the owner of a code sequence and means for receiving and decoding a code sequence from the caller each shares a recognizer for decoding the tones from the owner's or the caller's touch-tone telephone as the owner or caller enters the selected code sequences from the telephone keypad, with the recognizer being used in the set mode to decode the owner entered code sequences and in the receive mode to decode the caller entered code sequences.

14. A single line, plug-in telephone answering machine comprising:

microprocessor means for controlling the machine operation in response to a countable set of interrupt signals which represent changes or different operational states of the answering machine including a set mode and a receive mode;

general out-going message means responsive to the microprocessor means for providing a general message to all callers, said general message having been previously recorded by the owner;

a countable set of special out-going message means responsive to the microprocessor means for providing a special message to a caller following the general message and the entry by the caller of a corresponding code sequence by means of the caller's telephone, said special message and code sequence having been previously recorded and stored by the owner;

means responsive to the microprocessor means for recording the general and special out-going messages by the owner;

means responsive to the microprocessor means for entry by the owner of the out-going message code sequence for each of said special out-going message means and for receiving the code sequence from the caller to select the corresponding special out-going message; and means coupled to the microprocessor means for storing the machine algorithms and the code sequences for the special out-going messages entered by the owner;

said microprocessor means further providing for decoding the code sequence from the caller to select a corresponding special out-going message, and for comparing the stored code sequences with the caller entered code sequence and activating the corresponding special out-going message means when a match of the stored and caller entered code sequences is found.

15. An answering machine as in claim 14 wherein the countable set of interrupt signals which control the operation of the microprocessor means includes:

a first interrupt signal that occurs when the set mode is selected for the owner to select code sequences, record out-going messages and listen to in-coming messages;

a second interrupt signal that occurs when the receive mode is selected to permit the answering machine to answer telephone calls, to play out-going messages for the caller, and to record in-coming messages from callers;

a third interrupt signal that occurs when the owner or the caller enters a code sequence; and a fourth interrupt signal that occurs when a preset number of rings on the telephone line has been counted.

16. A single line, plug-in telephone answering machine comprising:

microprocessor means for controlling the machine operation in response to a countable set of interrupt signals which represent changes or different operational states of the answering machine including a set mode and a receive mode;

a countable in-coming message means responsive to the microprocessor means for providing a caller a location to leave a special message following the entry by the caller of a corresponding code sequence by means of the caller's telephone, said code sequence having been previously selected and stored by the owner;

default in-coming message means responsive to the microprocessor mean sor providing a general message area for callers to leave a message if the caller does not enter a recognized code sequence;

means responsive to the microprocessor means for playing back the default and special in-coming messages by the owner;

means responsive to the microprocessor means for entry by the owner of a special in-coming message code sequence for each of said special in-coming message means and for receiving a code sequence from the caller to select a special in-coming message location; and means coupled to the microprocessor means for storing the machine algorithms and the code sequences for the special in-coming message locations established by the owner;

said microprocessor means further providing for decoding a code sequence from the caller to select a corresponding special in-coming message location, and for comparing the stored code sequences with the caller entered code sequence and activating the corresponding special in-coming message location when a mathc of the stored and caller entered code sequences is found.

17. An answering machine as in claim 16 wherein the countable set of interrupt signals which control the operation of the microprocessor means includes:

a first interrupt signal that occurs when the set mode is selected for the owner to select code sequences, record out-going messages and listen to in-coming messages;

a second interrupt signal that occurs when the receive mode is selected to permit the answering machine to answer telephone calls, to play out-going messages for the caller, and to record in-coming messages from callers;

a third interrupt signal that occurs when the owner or the caller enters a code sequence; and a fourth interrupt signal that occurs when a preset number of rings on the telephone line has been counted.

18. A single line, plug-in telephone answering machine comprising:

microprocessor means for controlling the machine operation in response to a countable set of interrupt signals which represent changes or different operational states of the answering machine including a set mode and a receive mode;

general out-going message means responsive to the microprocessor means for providing a general message to all callers, said general message having been previously recorded by the owner;

a countable set of special out-going message means responsive to the microprocessor means for providing a special message to a caller following the general message and the entry by the caller of a corresponding out-going message code sequence by means of the caller's telephone, said special out-going message and special out-going message code sequence having been previously recorded and stored by the owner;

means responsive to the microprocessor means for recording the general and special out-going messages by the owner;

a countable set of special in-coming message means responsive to the microprocesor means for providing a caller a location to leave a special message following the entry by the caller of a corresponding in-coming message code sequence by means of the caller's telephone, said in-coming message code sequence having been previously selected and stored by the owner;

default in-coming message means responsive to the microprocessor means for providing a general message area for callers to leave a message if the caller does not enter a recognized special in-coming message code sequence;

means responsive to the microprocessor means for playing back the default and special in-coming messages recorded by the callers;

means responsive to the microprocessor means for entry by the owner of an out-going message code sequence for each of said special out-going message means and of a special in-coming message code sequence for each of said special in-coming message means, and for receiving an out-going message code sequence entered by the caller to select a corresponding special out-going message and receiving a special in-coming message code sequence from the telephone of the caller to select a corresponding special in-coming message location; and means coupled to the microprocessor means for storing the machine algorithms, the out-going message code sequences for the special out-going message means entered by the owner, and the special in-coming message code sequences for the special in-coming message locations established by the owner;

said microprocessor means further providing for decoding an out-going message code sequence entered by the caller to select a corresponding special out-going message, for decoding a special in-coming message code sequence from the telephone of the caller to select a corresponding special in-coming message location, for comparing the stored out-going message code sequences with the caller entered out-going message code sequence and activating the corresponding special out-going message means when a match of the stored and caller entered out-going message code sequences is found, and for comparing the stored special in-coming message code sequences with the caller entered special in-coming message code sequences and activating the corresponding special in-coming message locations when a match of the stored and caller entered special in-coming message sequences is found.

19. An answering machine as in claim 18 wherein the countable set of interrupt signals which control the operation of the microprocessor means includes:

a first interrupt signal that occurs when the set mode is selected for the owner to select code sequences, record out-going messages and listen to in-coming messages;

a second interrupt signal that occurs when the receive mode is selected to permit the answering machine to answer telephone calls, to play outgoing messages for the caller, and to record in-coming messages from callers;

a third interrupt signal that occurs when the owner or the caller enters a code sequence; and a fourth interrupt signal that occurs when a preset number of rings on the telephone line has been counted.

* * * * *

REEXAMINATION CERTIFICATE (2918th)

United States Patent [19]

Eswaran

[11] B1 4,847,889

[45] Certificate Issued Jun. 18, 1996

[54] SINGLE-LINE, PLUG-IN TELEPHONE ANSWERING MACHINE

[76] Inventor: Kapali Eswaran, 750 Kings Mountain Rd., Woodside, Calif. 94062

Reexamination Request:
No. 90/003,426, May 5, 1994

Reexamination Certificate for:
Patent No.: 4,847,889
Issued: Jul. 11, 1989
Appl. No.: 151,424
Filed: Feb. 2, 1988

[51] Int. Cl.⁶ .................................................. H04M 1/65
[52] U.S. Cl. ............................ 379/67; 379/76; 379/77
[58] Field of Search .............................. 379/67, 70, 73, 379/76, 77, 88, 89

[56] References Cited

U.S. PATENT DOCUMENTS

| | | | |
|---|---|---|---|
| 4,122,306 | 10/1978 | Friedman et al. | 379/73 |
| 4,194,089 | 3/1980 | Hashimoto | 379/76 |
| 4,420,656 | 12/1983 | Freeman | 379/73 |
| 4,571,458 | 2/1986 | Bond | 379/77 |
| 4,578,540 | 3/1986 | Borg et al. | 379/88 X |
| 4,747,126 | 5/1988 | Hood et al. | 379/74 |
| 4,811,383 | 3/1989 | Hashimoto | 379/76 |
| 4,850,005 | 7/1989 | Hashimoto | 379/51 |

FOREIGN PATENT DOCUMENTS

| | | |
|---|---|---|
| 60-72362 | 4/1985 | Japan . |
| 60-152159 | 8/1985 | Japan . |
| 62-18159 | 1/1987 | Japan . |

*Primary Examiner*—Thomas W. Brown

[57] ABSTRACT

An answering machine with one or more special features. These features include either means for providing multiple out-going messages, or multiple in-coming message locations, or both, with the message locations being selectable by the caller by means of preselected code sequences entered by the owner. When both portions of the present invention are present there are two sets of code sequences, one for out-going messages and another for in-coming messages. The number of digits in each code sequence can be the same or different, as can the actual codes since the detection of the proper code is time dependent on where in the cycle of the answering sequence the answering machine is at the time that the caller enters the code sequence.

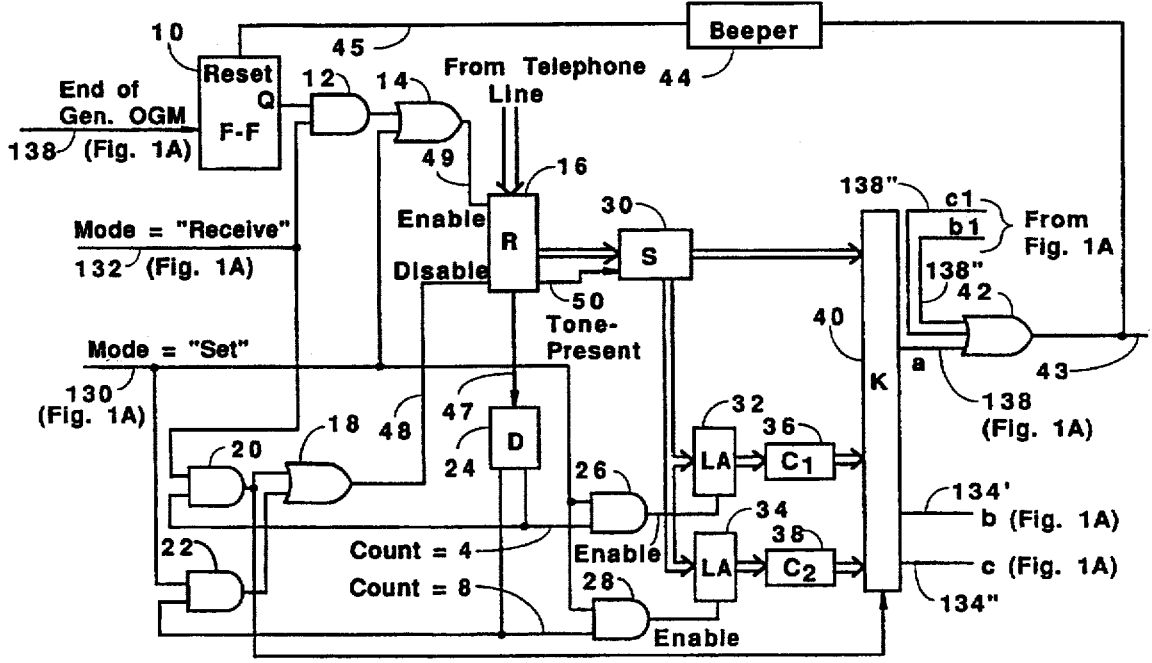

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5–8, 18 and 19 is confirmed.

Claims 1, 2, 3 and 14 are cancelled.

Claims 4, 9, 15 and 16 are determined to be patentable as amended.

Claims 10–13 and 17, dependent on an amended claim, are determined to be patentable.

New claim 20 is added and determined to be patentable.

4. [A telephone answering machine as in claim 1: further including] *A single line, plug-in telephone answering machine comprising:*

*general out-going message means for providing a general message to all callers, said general message having been previously recorded by the owner;*

*a countable set of special out-going message means for providing a special message to a caller following the general message and the entry by the caller of a corresponding code sequence by means of the caller's telephone, said special message and code sequence having been previously recorded and stored by the owner;*

*means for recording the general and special out-going messages by the owner;*

*means for entry by the owner of an out-going message code sequence for each of said special out-going message means;*

*means for storing the code sequences for the special out-going messages entered by the owner;*

*means for receiving and decoding the code sequence from the caller to select the corresponding special out-going message;*

*means for comparing the stored code sequences with the caller entered code sequence and activating the corresponding special out-going message when a match of the stored and caller entered code sequences is found;* means for placing the answering machine in either a set or a receive [code] *mode,* in the set mode the owner can record the general and special out-going messages and select a code sequence for each special out-going message, and in the receive mode the answering machine will answer the telephone and accept code sequences from a caller; and wherein said means for entry by the owner of code sequences for special out-goiong messages and means for receiving and decoding a code sequence from the caller to select out-going message each share a recognizer for decoding the tones from the owner's or the caller's touch-tone telephone as the owner or caller enters a selected code sequence from the telepone keypad, with the recognizer being used in the set mode to decode the owner entered code sequences and in the receive mode to decode the caller entered code sequences.

9. A single line, plug-in telephone answering machine comprising:

general out-going message means for providing a general message to all callers, said general message having been previously recorded by the owner;

a countable set of special out-going message means for providing a special message to a caller following the general message and the entry by the caller of a corresponding out-going message code sequence by means of the caller's telephone, said special out-going message and special out-going message code sequence having [bee] *been* previously recorded and stored by the owner;

means for recording the general and special out-going messages by the owner;

a countable set of special in-coming message means for providing a caller a location to leave a special message following the entry by the caller of a corresponding in-coming message code sequence by means of the caller's telephone, said in-coming message code sequence having been previously selected and stored by the owner;

default in-coming message means for providing a general message area for callers to leave a message if the caller does not enter a recognized special in-coming message code sequence;

means for playing back the default and special incoming messages;

means for entry by the owner of an out-going message code sequence for each of said special out-going message means, and for entry by the owner of a special in-coming message code sequence for each of said special in-coming message means;

means for storing the out-going message code sequences for the special out-going message means entered by the owner, and for storing the special in-coming message code sequences for the special in-coming message locations established by the owner;

means for receiving and decoding an out-going message code sequence entered by the caller to select the corresponding special out-going message, and for receiving and decoding a special in-coming message code sequence from the telephone of the caller to select the corresponding special in-coming message location; and means for comparing the stored out-going message code sequences with the caller entered out-going message code sequence and activating the corresponding special out-going message when a match of the stored and caller entered out-going message code sequences is found, and for comparing the stored special in-coming message code sequences with the caller entered special in-coming message code sequence and activating the corresponding special in-coming message locations when a match of the stored and caller entered special in-coming message code sequences is found.

15. [An answering machine as in claim 14] *A single line, plug-in telephone answering machine comprising:* microprocessor means for controlling the machine operation in response to a countable set of interrupt signals which represent changes or different operational states of the answering machine including a set mode and a receive mode;

general out-going message means responsive to the microprocessor means for providing a general message to all callers, said general message having been previously recorded by the owner;

a countable set of special out-going message means responsive to the microprocessor means for providing a special message to a caller following the general message and the entry by the caller of a corresponding code sequence by means of the caller's telephone, said special message and code sequence having been previously recorded and stored by the owner;

means responsive to the microprocessor means for recording the general and special out-going message by the owner;

means responsive to the microprocessor means for entry by the owner of the out-going message code sequence for each of said special out-going message means and for receiving the code sequence from the caller to select the corresponding special out-going message; and means coupled to the microprocessor means for storing the machine algorithms and the code sequences for the special out-going messages entered by the owner;

said microprocessor means further providing for decoding the code sequence from the caller to select a corresponding special out-going message, and for comparing the stored code sequences with the caller entered code sequence and activating the corresponding special out-going message means when a match of the stored and caller entered code sequences is found;

wherein the countable set of interrupt signals which control the operation of the microprocessor means includes:

a first interrupt signal that occurs when the set mode is selected for the owner to select code sequences, record out-going messages and listen to in-coming messages;

a second interrupt signal that occurs when the receive mode is selected to permit the answering machine to answer telephone calls, to play out-going messages for the caller, and to record in-coming messages from callers;

a third interrupt signal that occurs when the owner or the caller enters a code sequence; and a fourth interrupt signal that occurs when a preset number of rings on the telephone line has been counted.

16. A single line, plug-in telephone answering machine comprising:

microprocessor means for controlling the machine operation in response to a countable set of interrupt signals which represent changes or different operational states of the answering machine including a set mode and a receive mode;

a countable set of special in-coming message means responsive to the microprocessor means for providing a caller a location to leave a special message following the entry by the caller of a corresponding code sequence by means of the caller's telephone, said code sequence having been previously selected and stored by the owner;

default in-coming message means responsive to the microprocessor [mean sor] means for providing a general message area for callers to leave a message if the caller does not enter a recogized code sequence;

means responsive to the microprocessor means for playing back the default and special in-coming messages by the owner;

means responsive to the microprocessor means for entry by the owner of a special in-coming message code sequence for each of said special in-coming message means and for receiving a code sequence from the caller to select a special in-coming message location; and means coupled to the microprocessor means for storing the machine algorithms and the code sequences for the special in-coming message locations established by the owner;

said microprocessor means further providing for decoding a code sequence from the caller to select a corresponding special in-coming message location, and for comparing the stored code sequences with the caller entered code sequence and activating the corresponding special in-coming message location when a [mathc] match of the stored and caller entered code sequences is found.

20. A single line, plug-in telephone answering machine comprising:

general out-going message means for providing a general message to all callers, said general message having been previously recorded by the owner;

a countable set of special out-going message means for providing a special messsage to a caller following the general message and entry by the caller of a corresponding code sequence by means of the caller's telephone, said special message and code sequence having been previously recorded and stored by the owner;

means for recoding the general and special out-going messages by the owner;

means for entry by the owner of an out-going message code sequence for each of said special out-going message means;

means for storing the code sequences for the special out-going message entered by the owner;

means for receiving and decoding the code sequence from the caller to select the corresponding special out-going message;

means for comparing the stored codes sequences with the caller entered code sequence and activating the corresponding special out-going message when a match of the stored and caller entered code sequences is found; and incoming message means for recording an incoming message from the caller subsequent to said provision of said general message by said general out-going message means or said provision of said special message by said countable set of special out-going message means.

* * * * *